United States Patent [19]

Martin

[11] Patent Number: 4,752,430
[45] Date of Patent: Jun. 21, 1988

[54] METHOD FOR MANUFACTURING TRUCK BODIES

[75] Inventor: Roger J. Martin, Toronto, Canada

[73] Assignee: Unicell Limited, Toronto, Canada

[21] Appl. No.: 876,412

[22] Filed: Jun. 20, 1986

Related U.S. Application Data

[62] Division of Ser. No. 512,184, Jul. 11, 1983.

[51] Int. Cl.⁴ .............................................. B29C 41/08
[52] U.S. Cl. ...................................... 264/309; 425/375
[58] Field of Search .................. 264/309; 425/73, 375, 425/439, DIG. 238, 219

[56] References Cited

U.S. PATENT DOCUMENTS

3,084,973   4/1963   Beckley ................................ 264/309
3,606,162   9/1971   Lehmann ............................. 118/123

Primary Examiner—James Derrington
Attorney, Agent, or Firm—Fetherstonhaugh & Co.

[57] ABSTRACT

A method of forming the required body shell includes the steps of dispensing a coating of glass fibre reinforced resin onto the forming surface of a mold while moving the dispenser along successive longitudinally displaced U-shaped paths which traverse the forming surface to form a continuous coating covering the top and side forming walls of the mold cavity. The further step of compacting the coating by applying a compactor to the inner surface of the coating and moving the compactor along the same path as that followed by the dispenser at a point located downstream from the dispenser.

2 Claims, 6 Drawing Sheets

METHOD FOR MANUFACTURING TRUCK BODIES

RELATED APPLICATIONS

This application is a division of application Ser. No. 512,184 filed July 11, 1983 pending.

FIELD OF INVENTION

This invention relates to improvements in glass fibre reinforced molding machines and methods.

PRIOR ART

Large glass fibre reinforced resin bodies such as the body shells of trucks or the like are normally made from a series of glass fibre panels which are fabricated by techniques similar to those which have been used for many years when manufacturing such bodies from wood or metal or the like.

Attempts have been made to manufacture glass fibre bodies of the foregoing type as unitary structures. Such attempts have, however, utilized conventional manual fabrication methods wherein glass fibre cloth is manually applied to the inner surface of the mold and resin is sprayed or otherwise applied to the glass fibre cloth and manually rolled into the glass fibre cloth. This process is costly and time consuming. Furthermore, the environment in which the operator must work is such that it may constitute a health hazard with the result that face masks and other breathing apparatus may be required.

When attempting to apply a coating of glass fibre reinforced resin to the surface of a mold, it is important to maintain the dispenser at a fixed distance from the surface which is being molded and to cause the point at which the coating material is being deposited on the mold to traverse the surface at a predetermined constant speed. While it may be possible to design a computer controlled tracking system which will permit a dispenser nozzle to track along a U-shaped track conforming to the U-shaped interior configuration of a mold required to produce a container body shell of a truck or the like, such a system would be very expensive when produced in the relatively small numbers required in this field.

After glass fibre reinforced resin has been applied to the surface of a mold, it is necessary to permit the molded product to remain in the mold for some time after molding to permit it to cure before it is removed from the mold. If the mold and the spray mechanism cannot be separated from one another, the spray mechanism must remain inoperative during the curing stage of the molding process. This considerably reduces the efficiency of the molding operation. Furthermore, the molds which are used for molding container bodies are very large and cannot be moved from one site to another with any great facility.

Generally, the mold which is required for molding a container body has an open upper end and if resin is sprayed onto the surfaces of the mold, a portion of the resin will contaminate the atmosphere within the mold and this contamination can spread throughout the entire work area.

It is an object of the present invention to provide a machine for manufacturing unitary glass fibre reinforced body shells which permits the required thickness of fibre glass reinforced resin to be applied to the entire surface of a mold cavity without requiring an operator to operate within the mold cavity.

It is a further object of the present invention to provide a tracking mechanism which will operate to maintain the dispenser at a fixed distance from the point on the mold against which the spray discharge is directed and which causes said point to move along the surface of the mold at a constant speed.

It is a further object of the present invention to provide a simple and inexpensive form of mechanical tracking mechanism which permits the dispenser to deposit the coating material uniformly onto the U-shaped cross-sectional configuration of a mold.

It is a further object of the present invention to provide a simple and inexpensive canopy which is deployed to close the open upper end of the mold when the dispenser head tracks along the mold cavity.

It is yet another object of the present invention to provide an end cap for closing an end of the mold and for supporting the dispenser mechanism for movement from one mold to another.

SUMMARY OF INVENTION

According to one aspect of the present invention, there is provided a machine for manufacturing a unitary glass fibre reinforced body shell in a mold having a top forming wall and a pair of oppositely disposed side forming walls extending from opposite side edges of the top forming wall to form a mold cavity which is generally U-shaped in cross section, said cavity being longitudinally elongated and having a length at least equal to the length of the required shell, comprising a carriage adapted for movement along said mold in the direction of its longitudinal extent, at least a portion of said carriage being arranged to extend into said mold cavity in use, a turret mounted on said carriage for rotation about a first axis which extends in the direction of said longitudinal movement of said carriage in use, an arm slidably mounted on said turret for movement in a radial direction with respect to said first axis, dispenser means mounted on said arm for rotation and radial movement with said arm with respect to said turret, said dispenser being adapted to dispense glass fibre reinforced resin, guide means communicating with said turret and said arm, said guide means being adapted to cause said arm to reciprocate with respect to said turret in said radial direction to maintain a substantially constant length of trajectory extending between the dispenser and the wall of the mold, and drive means rotatably driving the turret about said first axis under the control of said guide means thereby to cause the point of contact of the dispenser trajectory to travel along the mold surface at a constant speed to uniformly distribute the coating thereon.

According to a further aspect of the present invention there is provided a spray assembly for use in applying a coating of a fluid to a surface of a former comprising, spray means adapted to spray a jet of fluid along a predetermined path onto the surface of the former when spaced a predetermined distance therefrom in a first direction, compactor means for spreading and compacting the coating after it is applied to said surface, support means for supporting said spray means and said compactor means for movement therewith relative to said former, said dispenser and spray means being; longitudinally spaced with respect to one another in said first direction whereby the spreader may bear against the coating when the spray means is spaced said predetermined distance from said surface and, laterally spaced with respect to the spray means to be removed from the path of said jet of fluid, drive means adapted to effect relative movement between the support means and the former to cause the spray means and the spreader means to move simultaneously with respect to the former to respectively lay down and spread a coating of fluid on said surface.

According to a further aspect of the present invention there is provided a mechanical guidance system for guiding a work head along a predetermined path comprising, a U-shaped guide track extending in a first plane, a turret mounted for rotation about a first axis which extends perpendicular to said first plane and is located equidistant from each side of the U-shaped guide track, a track follower slidably mounted on said turret and engaging said track for movement with respect to said turret in a first radial direction with respect to said first axis in response to movement along said track, a work head support adapted to support a work head, said work head support being slidably mounted on said turret for radial movement with respect to said first axis in a direction opposite said first direction, power transmission means interconnecting said track follower and said slide member whereby the slide is the slave of the follower, said power transmission means being adapted to cause the radial movement of the work head support with respect to the turret to be greater than that of the track follower whereby the path along which the work head moves in use, is proportional to and substantially longer than the U-shaped guide track.

According to yet a further aspect of the present invention there is provided a method of forming a unitary glass fibre reinforced polyester shell for a truck or the like in a mold which has a top wall forming surface and a pair of side wall forming surfaces which are arranged and proportioned to provide a mold cavity which is U-shaped in cross-section and longitudinally elongated to conform to the configuration of the required body shell, comprising, dispensing a coating of glass fibre reinforced resin onto the forming surface of the mold while moving the dispenser along successive longitudinally displaced U-shaped paths which traverse the forming surface thereby to form a continuous coating covering the top and side forming walls of the mold cavity, compacting the coating by applying a compactor to the inner surface of the coating and moving the compactor along said U-shaped path downstream of said dispenser.

According to a further aspect aspect of the present invention there is provided a machine for manufacturing unitary glass fibre reinforced products comprising, a mold having walls defining a mold cavity which is open at a first end and open at its top, dispenser means for dispensing glass fibre reinforced resin onto the walls of the mold, dispenser mounting means mounting the dispenser for lengthwise movement along said mold cavity from the open end thereof, an end cap assembly for closing the open end of the mold comprising, an end cap having an open top and an open end, the open end having a configuration matching that of the open end of the mold to cooperation therewith to define an enclosure which is open at the top, a steerable undercarriage supporting said end cap for movement into and out of engagement with said mold, means for realeasably securing said end cap in an end to end butting relationship with said mold.

According to a further aspect of the present invention there is provided a machine for manufacturing a glass fibre reinforced resin body comprising, a mold having a mold cavity which has an open upper end, a dispenser for dispensing glass fibre reinforced resin, dispenser mounting means mounting said dispenser for lengthwise movement with respect to said mold from one end thereof to the other, canopy means mounted adjacent one end of said mold and secured to said dispenser mounting means, said canopy means being adapted to be deployed to cover the open upper end of the mold in response to lengthwise movement of said dispenser mounting means, fume extraction means communicating with said mold for extracting fumes from said mold cavity during molding.

According to a further aspect of the present invention there is provided a mobile resin dispenser for use in association with a plurality of molds each having a mold cavity which is open at one end and has a pair of upper side edges extending longitudinally on either side of an open upper end comprising, an end cap having an open end adapted to sealingly engage the open end of the mold cavity of the selected mold, said end cap having an open upper end arranged to be aligned with the open top of the selected mold in use, a dispenser adapted to dispense resin onto the walls of the selected mold, dispenser mounting means mounting the dispenser on the upper end of the end cap for movement therewith from mold to mold, means supporting said end cap for movement from one mold to another to operably locate that end cap with its open end sealingly engaging the open end of a selected mold and its open upper end aligned with the open top of the selected mold whereby the dispenser mounting means may be activated to traverse the upper end of the mold from the open end to the closed end in use.

According to a further aspect of the present invention there is provided in a molding machine for molding large glass fibre reinforced resin bodies wherein the mold has a mold cavity which has an open top end, the improvement of, a mold inverter comprising, support means for engaging opposite ends of said mold for rotation about a horizontal axis to invert said mold, elevator means engaging said support means for elevating said support means to raise the mold clear of its underlying support prior to rotation about the horizontal axis to invert the mold, drive means engaging said support means for rotatably driving said support means about said horizontal axis to invert the mold as required in use.

PREFERRED EMBODIMENT

The invention will be more clearly understood after reference to the following detailed specification read in conjunction with the drawings wherein.

Figure 1:
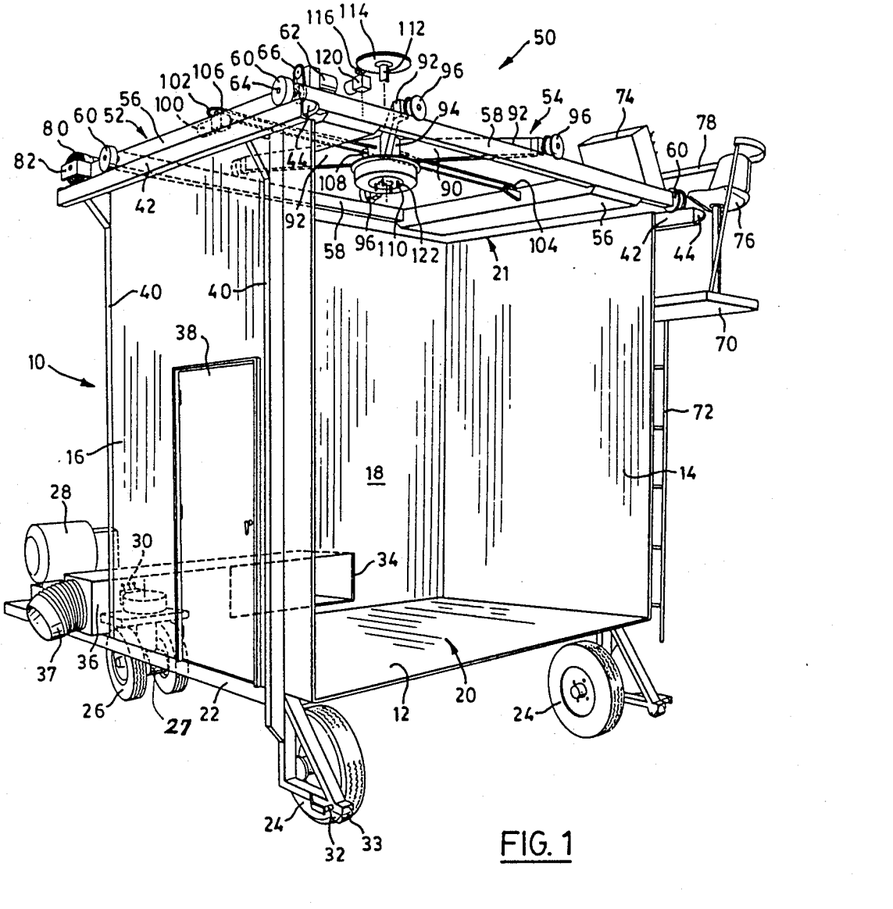
FIG. 1 is a pictorial end view of the end cap assembly which supports and transports the dispenser from one mold to the other, the major portion of the dispenser structure being removed to facilitate illustration.

With reference to FIG. 1 of the drawings the reference numeral 10 generally to a mobile end cap which may be transported from one mold to another to perform successive molding operations. The end cap 10 comprises a bottom wall 12, side walls 14 and 16 and an end wall 18 which define an enclosure 20 which is open at its top and at its front end. A frame 22 supports the bottom wall 12. Front wheels 24 are mounted for rotation on the frame 22 and steerable wheels 26 are mounted on the frame 22 at the rear of the end wall 18. A motor 27 is drivingly connected to the steerable wheels 26. Controls 30 are mounted on the frame 22 and are operable to steer the steerable wheels 26 and to control movement of the end cap 10 as required in use. An hydraulic power source 28 is mounted on the frame 22 and serves as the source for the various hydraulically operated systems described hereinafter.

For the purposes of securing the end cap with respect to a mold, a latch pin 32 and a roller 33 are mounted on the frame 22 at the lower front end thereof. The function of the latch pin 32 and roller 33 will be described hereinafter with reference to FIG. 5 of the drawings.

To permit removal of contaminated air from the enclosure 20, an outlet passage 34 is formed in the end wall 18 and communicates with a duct 36 which may be connected through flexible ducting 37 to a suitable source of vacuum.

An inspection door 38 opens through the side wall 16 and serves to provide access to the enclosure 20 to permit inspection of the mold when the end cap is operably positioned with respect to a mold in use.

The frame 22 includes upright frame members 40 which support guide rails 42 which extend longitudinally of the open top 21 of the enclosure 20. Each of the rails 42 has a tongue 44 projecting from its inner end. The tongue 44 is adapted to be inserted in the open end of the corresponding rails of the mold as will be described hereinafter.

A carriage generally identified by the reference numeral 50 is mounted at the open top 21 of the enclosure 20. The carriage 50 comprises a longitudinal transportation carriage generally identified by the reference numeral 52 and a transverse transportation carriage generally identified by the reference numeral 54. The longitudinal transportation carriage 52 comprises longitudinal frame members 56 and transverse frame members 58. Wheels 60 are mounted on the longitudinal transportation carriage 52 to ride on the guide rails 42. A motor 62 is drivingly connected to the shaft 64 of the wheels 60 by means of a power transmission belt 66 such that the motor 62 may be driven to drive the longitudinal transportation carriage 52 along the rails 42 as required in use. A gallery 70 is mounted on the longitudinal transportation carriage 52 for movement therewith. A step ladder 72 depends from the gallery 70 to provide access to the gallery as required in use. A control panel 74 is mounted on the longitudinal transportation carriage 52 and is accessible from the gallery 70. An operator seat 76 is also mounted on the gallery 70 and a safety rail 78 extends lengthwise of the gallery 70.

A canopy 80 is supported by mounting brackets 82 which are carried by the longitudinal transportation carriage 52 for movement therewith. The canopy 80 is mounted in a self-rewinding coil and has one end 84 secured with respect to the end cap 10 adjacent the end wall 18 such that as the longitudinal transportation carriage moves away from the end wall 18, the canopy is deployed to cover the open top 21 of the enclosure 20.

The transverse transportation carriage 54 consists of a frame 90 which has four arms 92 radiating outwardly from a central boss 94. Wheels 96 are mounted at the outer ends of the arms 92 and are arranged to ride along the transverse frame members 58 of the longitudinal transportation carriage 52.

Lateral movement of the transverse transportation carriage 54 is achieved by means of a motor 100 which is drivingly connected to the boss 94 of the transverse transportation carriage 54 by way of sprockets 102 and 104 and chain 106. One end of the chain 106 is connected to the boss 94 at one side of the boss and the other end of the chain is connected at the other side of the boss. One length of the chain passes through a passage 108 which is formed in the boss to extend between sprockets 102 and 104. The motor 100 is reversable so that it may be operated to drive the transverse transportation carriage 54 in opposite directions as required in use.

A drum 110 is mounted for rotation on the central boss 94 and is drivingly connected to a drive shaft 112. A gear wheel 114 is mounted on the drive shaft 112 and mashes with a gear wheel 116 which is mounted on the output shaft of a motor assembly 120. The motor assembly 120 may be powered by the operator through the control panel 74 to rotatably drive the drum 110 through the gear wheels 116 and 114 and drive shaft 112 as required in use.

Figure 2:
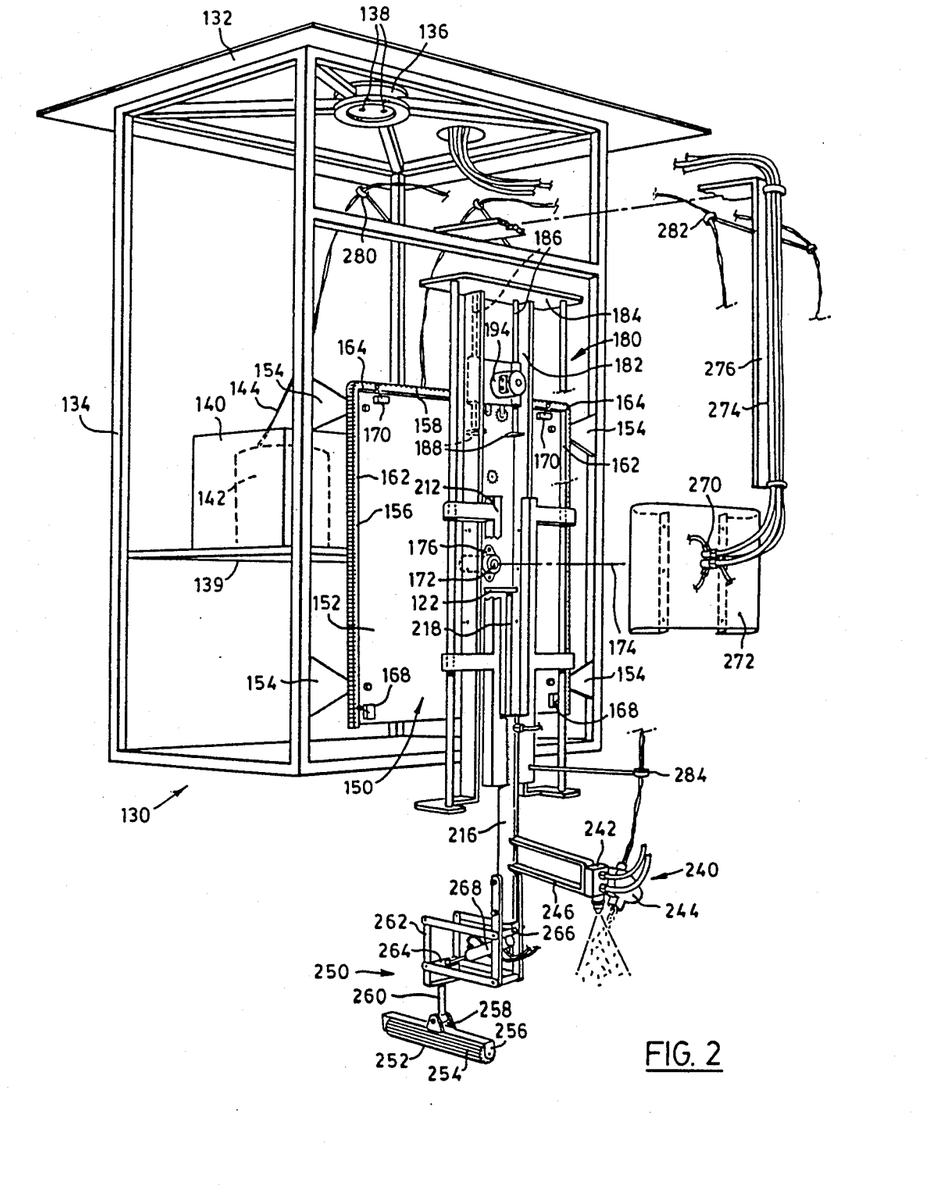
FIG. 2 is a pictorial view of the dispenser assembly which as been removed from FIG. 1.

Mounting screws 122 are mounted on the drum 110 and extend downwardly therefrom. The mounting screws 122 are used to support a turret assembly 130 which is illustrated in FIG. 2 and which will be described.

The turret assembly 130 consists of a frame 134 which has a face plate 132 mounted at its upper end. The face plate 132 serves to close the underside of the transverse transportation carriage 54.

A hub 136 is mounted at the upper end of the frame 134 and is formed with mounting passages 138 which are arranged to receive the mounting screws 122 of the drum 110.

The frame 134 is of a rigid tubular construction and has a platform 139 formed thereon. The platform 139 supports a number of containers 140 within which spools 142 of glass fibre are located. The end 144 of the spool of glass fibre 142 is unwound from the spool and fed to a chopper as will be described hereinafter.

The guide means which is generally identified by the reference numeral 150 serves to guide the movement of the dispenser head which will be described hereinafter about the U-shaped configuration of the interior surface of the mold which will also be described hereinafter. The drive means 190 co-operates with the guide means 150 to ensure that the length of the trajectory L (FIG. 3) is substantially constant and the point of contact of the trajectory is caused to travel along the surface of the mold at a constant speed to uniformly distribute the coating thereon.

The guide means 150 comprises a guide plate 152 which is supported on brackets 154 which are carried by the frame 134.

The guide track 156 extends about the side edge of the guide plate 152 and includes a horizontal run 158 which extends along the top edge of the plate 152 and vertical runs 162 which extend downwardly along opposite side edges of the plate 152. Rounded corners 164 connect the horizontal run 158 and the vertical runs 162 to provide a continuous generally U-shaped guide track. The guide track is proportioned so that the horizontal run and vertical ruls are directly proportional to the dimensions of width and height of the side walls of the mold. That is to say, the U-shaped configuration of the guide track is geometrically similar to the U-shaped configuration of the cross-section of the mold and is preferably dimensioned to be one-third the dimensions of the mold.

Limit switches 168 and 170 are provided adjacent the ends of the horizontal 158 and vertical runs 162 respectively. The limit switches 168 and 170 are used to control the movement of the dispenser when the resin is being applied to the closed end wall of the mold as will be described hereinafter.

A stub shaft 172 is mounted centrally of the guide plate 152 and has an axis 174 extending normal to the guide plate 152.

A turntable generally identified by the reference numeral 180 has a bearing 176 mounted for rotation on the stub shaft 172 about the axis 174. The turntable 180 comprises a U-shaped channel member 182 upon which the bearing 176 is mounted. An end plate 184 is mounted at one end of the channel member 182. A pair of guide rods 186 have one end secured to the end plate 184 and their other end secured to lugs 188. The guide rods 186 extend in a spaced parallel relationship. A slide 192 is slidably mounted on the guide rods 186 for longitudinal movement therealong. The drive means 190 consists of a motor 194 which is mounted on the slide 192, and a pinion 196 which is mounted on the output shaft of motor 194 and meshes with the teeth of the guide track 156. The operation of the motor 194 is controlled by the operator from the control panel 74. By activating the motor 194 to drive the pinion 196 in one direction, the turntable 180 can be rotated in one direction about the axis 174 and by operating the motor 194 for rotation in the opposite direction, the turntable can be rotatably driven in the opposite direction about the axis 174.

It. will be seen that as the slide member 192 moves along the guide runs 158 and 162 and around corners 164, it will be caused to reciprocate on the guide rods 186 toward and away from the axis 174. This reciprocating movement is used as will be described hereinafter to deploy and retract the arm upon which the dispenser is mounted.

The turntable 180 has a second pair of guide rods 200 which extend from the end plate 184 to lugs 202 which are located at the opposite end of the channel member 182.

An arm which is generally identified by the reference numeral 210, comprises a slide 212 which has lugs 214 which are slidably mounted on the second pair of guide rods 200. The slide 212 can reciprocate radially with respect to the axis 174 by sliding along the guide rails 200.

A cylinder 216 has one end secured to the slide 212 as by welding or the like and projects outwardly therefrom. A piston (not shown) is slidably mounted in the cylinder 216 and has a piston rod 218 which projects outwardly from the cylinder 216. The end of the piston rod 218 is secured to a lug 222 which projects from the U-shaped channel member 182. Compressed air is admitted to the cylinder 216 by way of line 220. The cylinder 216 is operable to provide a reaction force which serves to maintain tension in the chain 224 while permitting radial extension of the arm 210, the extent and direction of movement of the arm 210 being controlled by the angular displacement of the turntable 180. This is achieved by means of a chain 224, a first end 226 of which is connected to the slide 212. The chain 224 extends around a sprocket 228 which is mounted for rotation on the U-shaped channel member 182 and around a sprocket 230 which is supported by a lug 232 which is mounted on the slide 192. The chain 224 also extends around a sprocket 232 which is mounted on the channel member 182. The second end 234 of the chain 214 is mounted on a lug 236 which is mounted on the slide 192.

It will be seen that as the motor 194 drives the pinion (gear wheel) 196 along the guide track 156, the second end 234 of the chain 224 and the sprocket 230 will move relative to the sprocket 232. The chain power transmission system thus provides that a unit distance radial movement of the pinion 196 with respect to the axis 174 will effect three unit radial distance movements of the arm 216, thereby providing the required proportional movement.

A dispenser for dispensing glass fibre reinforced resin is generally identified by the reference numeral 240. The dispenser consists of spray member 242 and a chopper member 244 which are mounted on a support bracket 246 which projects forwardly from the support arm 216. A suitable dispenser for use in this application is manufactured by Venus Products Inc. and is identified as an H.I.S. chopper gun.

Figure 3:
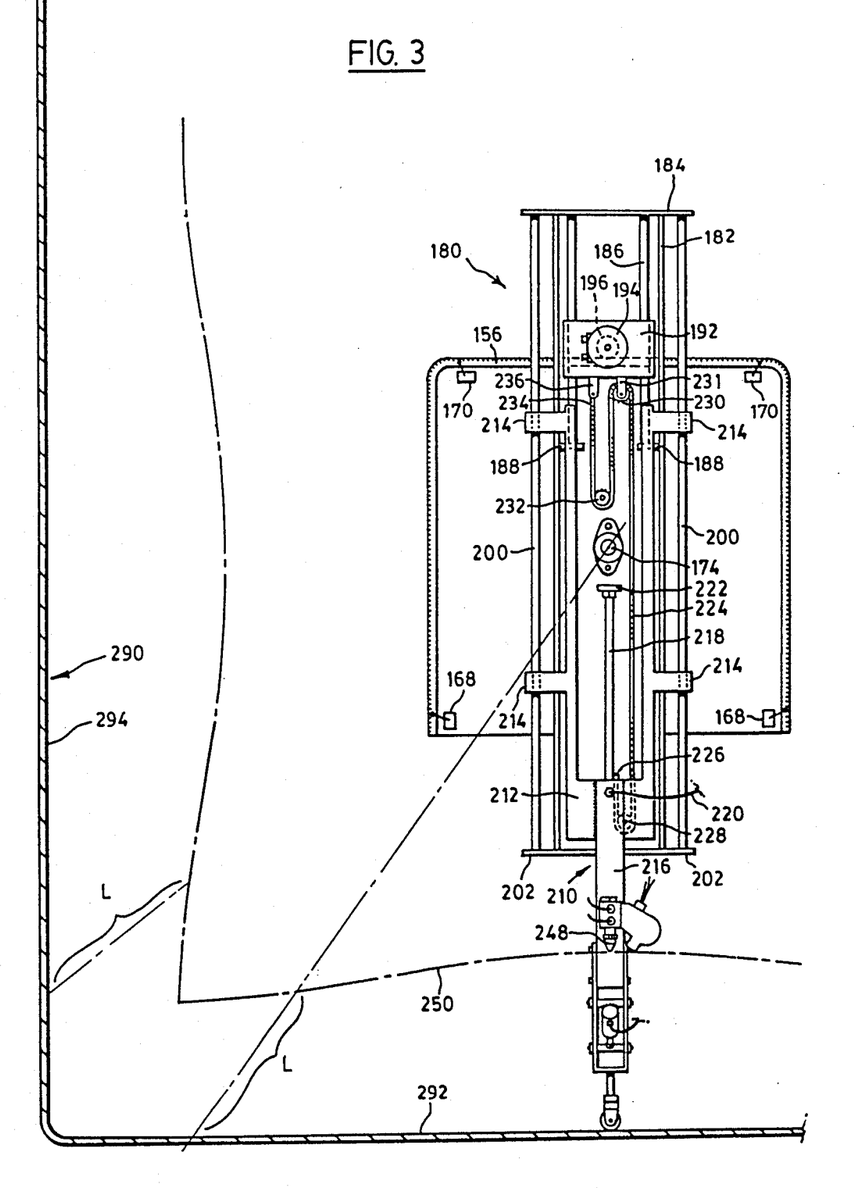
FIG. 3 is a front view of a dispenser head and its guidance system illustrating the path of the dispenser head around the mold.

The locus 250 along which the dispenser nozzle 248 is driven in use, is illustrated in FIG. 3 of the drawings. It will be noted that while the locus does not extend parallel to the walls 302 and 304 of the mold 300, the length L of the trajectory of the discharging spray from the nozzle 248 will remain substantially constant for all positions of the arm 210 in use.

Figure 8:
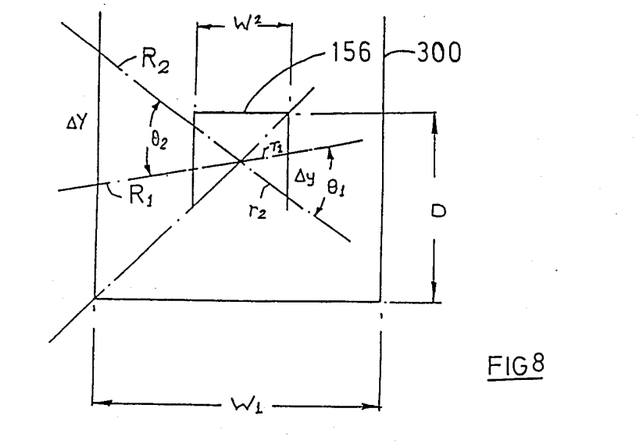
FIG. 8 is a diagram illustrating the geometry ot the constant speed tracking mechanism.
Figure 9:
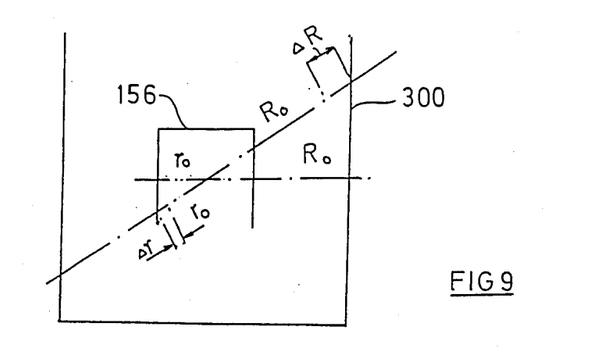
FIG. 9 is a diagram further illustrating the geometry ot the constant speed tracking mechanism.

The geometry of the guide track 156 and its location with respect to a mold 300 which is responsible for achieving constant speed of tracking along the mold is illustrated in FIGS. 8 and 9. The guide track 156 is proportioned such that the width $W_1 = 3W_2$ and the height $D = 2W_2$. The axis 174 is uniformly spaced from the side and bottom walls of the mold 300 and the side and top sections of the guide track 156.

With reference to FIG. 8 it will be seen that;

$\theta_1 = \theta_2$ $R_1 = 3r_1$ $R_2 = 3r_2$ therefore $\Delta Y = 3\Delta y$ therefore $dY = 3dy$ dividing by dt, $(dY)/(dt) = (3dy)/(dt)$ or $V_Y = 3V_y$ where $V_y$ = velocity of point of intersection of the radius R and the wall of the mold and, $V_y$ is the velocity of the point of intersection of the radius R and the guide track 156.

It follows that if the motor 194 moves at a constant speed along the guide track 156, the spray pattern will move along the surface of the mold at a constant speed which is three times the speed of travel of the motor 194.

The radial length of the arm 210 must also be adjusted to maintain a constant length of trajectory L (FIG. 3) and this is achieved by the geometry illustrated in FIG. 9 in combination with the chains and sprocket mechanisms illustrated in FIG. 3.

As shown in FIG. 9, as the intersection of the radius $r_o$ moves along the guide track 156, it extends by an amount Δr and as the radius $R_o$ travels along the surface of the mold 300 it extends by an amount ΔR. The sprockets 228, 23 and 232 and chain 224 is adapted to provide a 3:1 mechanical disadvantage and serves to amplify the radial movement Δr of the arm 210 such that;

$$3\Delta r = \Delta R$$

and consequently the extension and contraction of the arm 210 is effective in maintaining the length L of the trajectory at constant value thus ensuring that (when the carriage 50 is drawn along the guide rails 312 at a constant speed) the material which is applied to the mold will have a uniform density.

A compactor generally identified by the reference numeral 250 is mounted at the outer end of the cylinder 216. The spreader consists of a roller 252 which has a plurality of longitudinally extending ridges and a bracket 256. The bracket 256 is connected by means of lugs 258 to a shaft 260. A pivotal connection is provided between the shaft 260 and the lugs 258 to permit self-alignment of the roller 252 with respect to the coated surface of the mold. A parallelogram linkage 262 connects the shaft 260 to the outer end of the cylinder 216. An extensible ram 268 is connected to crossbars 264 and 266 which are located at opposite corners of the parallelogram linkage.

By extending the ram 268 pressure can be applied by the roller 252 to the surface of the coating which is applied to the mold. In addition, it will be noted that the parallelogram linkage 262 is constructed so that it can pivot through 180 degrees to locate the roller 252 directly below the nozzle 242 in the position shown in broken lines in FIG. 2. This permits the roller to extend into the corner of the mold which is formed between the closed end and the bottom wall.

To facilitate rotation of the turntable 180, the various fluid supply lines are connected through rotating joints 270 which are mounted on a cover plate 272 which is in turn mounted on the channel member 182. The flexible conduits 274 are supported on a bracket 276 which is secured to the frame 134.

The lengths 144 of glass fibre are supported by eyelets 280 282 and 284. These eyelets guide the fibre glass ends to the chopper 244.

The mold which is generally identified by the reference numeral 300 will now be described with reference to FIGS. 4,6 and 7 of the drawings.

The mold 300 consists of a bottom wall 302 and a pair of oppositely disposed side walls 304 which are arranged in a U-shaped cross-sectional configuration. An end wall 306 closes one end of the mold. The other end 308 of the mold is open. The mold is reinforced by U-shaped ribs 310 which extend around the side and across the bottom walls of the mold. Guide rails 312 extend along the upper edge of each side wall 304 and are supported by ribs 310. The guide rails 312 extend lengthwise of the mold and are arranged to be aligned with the guide rails 42 of the end cap 10. The guide rails 312 have openings formed in the ends adjacent the open end 302 of the mold to receive the tongues 44 of the guide rails 42 to maintain aligement with the guide rails 42 in use.

The mold 300 has legs 314 extending downwardly therefrom. The legs 314 which are located at the open end 308 of the mold have a ramp 316 attached thereto. A latch 318 is pivotally mounted on each ramp (see FIG.5). The latch 318 is connected to a lever arm 320 which is turn connected to a piston rod 322 of a pneumatic cylinder 324.

Figure 5:
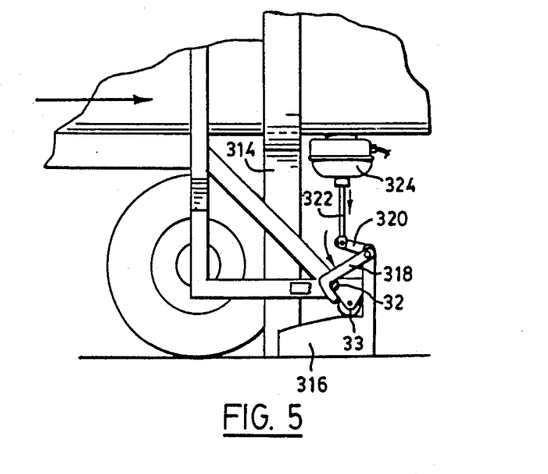
FIG. 5 is an enlarged detailed view of the mechanism used for releasably locking the end cap with respect to the mold.

In use, the end cap 10 is aligned with the open end of the mold by guiding the rollers 33 which are located at the front end of the end cap 10 up the ramp 316. This serves to align the open ends of the end cap and mold in a sealing relationship. The latch 318 is then activated to engage the latch pin 32 which serves to retain the end cap in a sealed relationship with respect to the open end of the mold.

The mold 300 has a socket 330 formed on the outer face of the end wall 306 into which a drive shaft 332 extends to drivingly engage the mold. The drive shaft 332 has a sprocket 334 mounted thereon for rotation about the axis 336. A motor 338 is mounted at the lower end of an arm 340. The motor 338 has a sprocket 342 drivingly connected to the sprocket 334 by means of a drive chain 344.

The arm 340 is a telescoping arm which consists of an upper portion 346 and a lower portion 348 which is telescoped within the lower end of the upper portion 346. The upper portion 346 is mounted on an overhead beam 350 which is carried by a suitable support structure such as the I-beams 352 of the building in which the mold is housed. A second arm 354 is mounted to pivot on lug 356 which is carried by the rail 350. A pivoting link arm generally identified by the reference numeral 353 has one end connected to the arm 354 and its other end connected to the rail 352. An extensible ram 358 has one end connected to the rail 352 and the other end connected to the link arm 353 such that by expanding and contracting the ram 358, the arm 354 is caused to pivot between the upright position shown in solid lines in FIG. 6 and the retracted position shown in broken lines in FIG. 6. The arm 354 has a lower portion 360 telescoped within the lower end thereof. The lower portions 348 and 360 of the arms 340 and 354 respectively, are raised and lowered by activating an extensible ram 362 which is mounted on the rail 350. A cable 364 has one end connected to the lower portion 348 of the arm 340 and its other end connected to a fixture 366 mounted on the rail 350. The cable 364 extends around a pulley 368 which is mounted on the shaft 370 of the ram 362. A cable 372 likewise, is connected between the stop 366 and the lower portion 360 of the arm 354. The lower portions 360 and 348 of the arms 354 and 340 respectively may therefore be raised or lowered by extending or contracting the ram 362.

A frame 380 is mounted at the lower end of the lower portion 360 of the arm 354 on a pivot pin 382 for rotation about the axis 384 which is axially aligned with the axis 336. The frame 380 has three releasable connector pins 386 which are adapted to engage the reinforcing rib 310 which is located at the open end 308 of the mold.

When a molded shell is to be removed from the mold, the arm 354 is pivoted to the upright position and the connecting pins 386 of the frame 380 are secured to the rib 310 as previously described. The ram 362 is then activated to raise the mold to the raised position shown in FIG. 6 and 7 of the drawings. The motor 338 is then activated to rotate the mold 300 about axis 336 and 384 to insert the mold. The molded shell 290 (FIG. 3) may then be removed from the mold 300.

Figure 4:
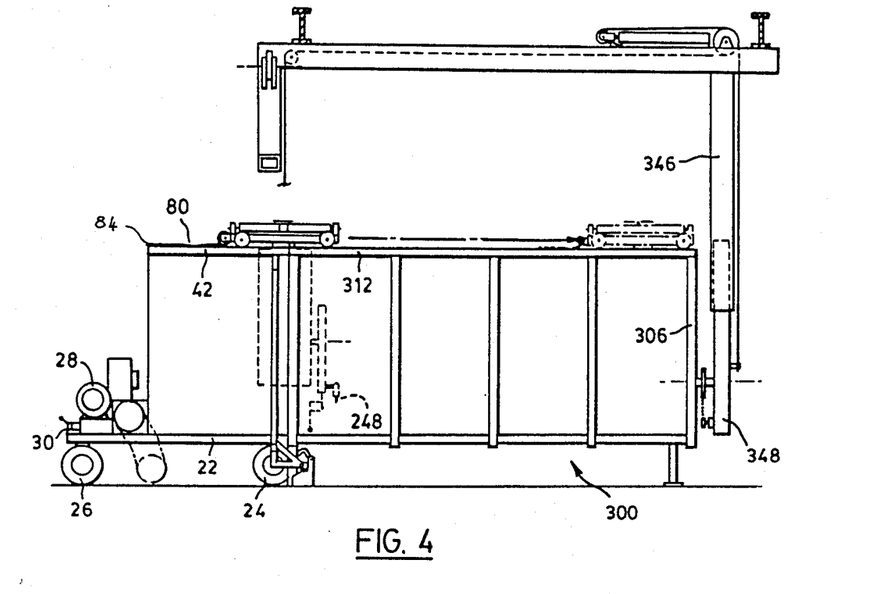
FIG. 4 is an end view of the assembled mold and end cap of the present invention.
Figure 6:
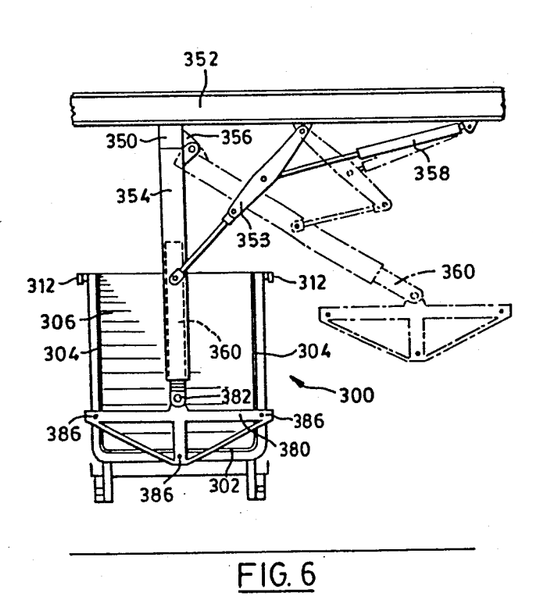
FIG. 6 is an end view of the mold assembly in an elevated position prior to rotation to an inverted position.
Figure 7:
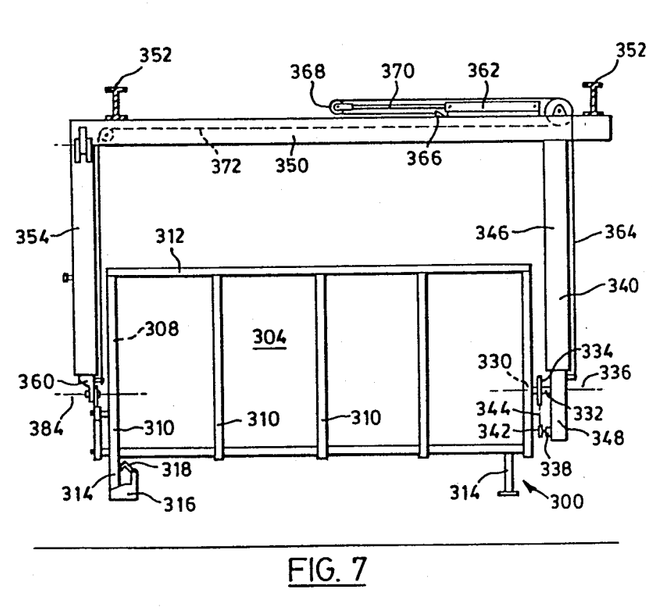
FIG. 7 is a side view of the mold of FIG. 6.

In use, the mold 300 is located as shown in FIG. 4 of the drawings with the feet 314 and 316 resting on the ground and the arm 354 pivoted out of alignment with the open end of the mold to the position shown in broken lines in FIG. 6. The end cap is then driven into alignment with the open end of the mold and the rollers 33 are driven up the ramps 316. The latch 318 is located in the position engaging the latch pin 32 so that the open end of the end cap is aligned with and sealingly engages the open end 308 of the mold 300 as shown in FIG. 4 of the drawings. The operator seated on the seat 76 then has a clear view of the interior of the mold cavity and is in a position to activate the longitudinal transportation carriage 52 to move it to the position shown in FIG. 4 wherein the dispenser nozzle 248 is located at the point where the spray coating is to commence. The nozzle is arranged such that the major axis of the elliptical configuration of the discharge pattern extehds parallel to the direction of forward movement of the transportation carriage 52 and the minor axis extends in the direction of movement of the dispensor 240 across the mold. A typical spray pattern is one where the major axis measures about 16 inches and the minor axis measures about 3 inches. It will be noted that as the longitudinal transporter carriage 52 moves along the rails 42 and 312, the canopy 80 is deployed. The lateral shift mechanism for the spray head is activated to centre the nozzle 248 with respect to the width of the mold when the arm 210 is in the upright position. The inner surface of the mold 290 having previously being coated with any required coating is then coated with glass fibre reinforced resin which is discharged from the nozzle 248 as the nozzle is caused to track transversely along the path 250 and longitudinally of the mold. Transverse tracking results from activating the motor 194 which as previously described causes the turntable 180 to rotate about the axis 174 and causes the arm 210 to extend and retract radially with respect to the axis 174 to maintain the trajectory length L substantially equal at all positions of the arm. Longitudinal movement of the carriage 52 is obtained by activating the motor 62. Spraying may then continue until a coating has been applied to the required areas of the inner surface of the side and bottom walls of the mold. When the spray head reaches the point where the spray discharges applied to the ends of the side and bottom wall which meet the end wall, spraying is discontinued and the longitudinal transportation carriage 52 is moved away from the end wall 306. The arm 210 is then retracted and the parallelogram linkage mechanism 262 is relocated in the position shown in broken lines in FIG. 2. The longitudinal transportation carriage 52 is then repositioned to locate the roller 252 on the portion of the sprayed coating which was not previously rolled and the motor 194 is activated to cause the roller to traverse the surface of the mold in engagement with the previously unrolled layers of sprayed coating.

In order to coat the end wall 306 of the mold the motor 120 is activated to rotate the turret 130 through 90 degrees. The motor 194 of the turntable is then activated to drive the pinion 196 along the guide track 156 until it is located between a micro switch 168 and a micro switch 170. The micro switches 168 and 170 are then activated by the operator such that when the motor 194 continues to drive the turntable, its movement away from the micro switch 168 will be limited by activating the adjacent micro switch 170 with the result that the pinion 196 will cycle back and forth along an L-shaped portion of the track 158 which corresponds to the area of the end wall and adjacent bottom wall which is to be coated when the end wall is being sprayed. The spray nozzle 248 is caused to move transversely across the mold when spraying the end wall 306 by activating the motor 100 which serves to drive the transverse transportation carriage 54. One half of the end wall 306 has been sprayed as previously described, the turret 130 is rotated about its vertical axis by activating the motor 120 so that it will rotate through 180 degrees. The spraying may then be reinitiated to coat the other half of the end wall 306. This is again achieved by causing the turntable 180 to travel back and forth between the other pair of micro switches 168 and 170.

The micro switches 168 and 170 may also serve to regulate the speed of movement of the motor 194 such that it may be caused to traverse the bottom wall 292 of the mold at a speed which is different from the traverse speed of the nozzle across the side walls 294 so that the thickness of the coating which is applied to the top wall may be different from that which is applied to the side walls as required in use.

After the spraying has been completed, the longitudinal transportation carriage 52 is activated to return to the end cap. Thereupon the end cap is released from its associated mold by releasing the latch mechanism 318 and the end cap is then driven away from the mold. The mold 290 is then inverted to facilitate removal of the molded product. The mold is inverted by positioning the arm 354 in the upright position shown in FIG. 6 of the drawings and securing the frame 380 to the open end of the mold. The mold is then rotated by activating the motor 338 which causes it to rotate about axis 384 and 336. The mold can then be transported away from the support mechanism to be held for a predetermined period of time before the molded product is removed. A further mold 300 may then be placed in an operable position within the rotating mechanism and the process repeated by relocating the end cap.

From the foregoing, it will be apparent that the apparatus of the present invention permits a unitary glass fibre reinforced resin shell having bottom side and end walls to be manufactured at high speed without requiring manual manipulation of the spray mechanism or roller mechanism.

The molding operation carried out by the apparatus of the present invention, is capable of producing glass fibre reinforced resin bodies at a speed substantially greater than that previously obtained in manual operations and the mechanism is capable of operating with only one operator with a result in labor cost saving. Furthermore, the elapsed time in the mold is greatly reduced by reason of the speed with which the items can be formed in the mold and this increases the number of parts which can be produced per mold per hour and this increases the rate of return on investment in the molds. In addition, material savings are effected in that glass fibre in the form of continious roving is substantially less expensive than glass fibre mats.

A further important feature of the apparatus of the present invention and its method of operation is that by reason of the fact that the canopy closes the work area of the mold as the nozzle moves along the mold and that a fume extraction system is provided in association with the end cap, hazardous fumes are evacuated from the mold cavity, thereby producing a safer working environment.

Normally, gelcoat in the form of pigmented polyester resin is applied to the surface of the mold cavity before the glass fibre reinforced resin is applied. The purpose of the pigmented polyester resin is to provide a smooth coloured exterior surface finish to the molded item. I have found that by coating selected areas of the mold with a polyester resin which does not contain any colouring pigment, it is possible to produce translucent sections in the body of reinforced glass fibre resin when the molding has been completed. Such translulent areas may have advantage to as forming skylights in the roof panel of a truck or the like and eliminate the need for removing sections of the roof to provide such skylights as is common practice at the present time.

These and other advantages of the apparatus of the present invention will be apparent to those skilled in the art.

I claim:
1. A method of forming a unitary glass fibre reinforced polyester shell for a truck or the like in a mold which has a top wall forming surface and a pair of side wall forming surfaces which are arranged and proportioned to provide a forming surface which is U-shaped in cross-section and longitudinally elongated to conform to the configuration of the required body shell comprising:
   (a) spraying a glass fibre reinforced resin from a dispenser onto said forming surface of the mold while moving the dispenser along successive longitudinally displaced U-shaped paths which traverse the forming surface to form a continuous coating which covers said forming surface.
   (b) compacting the coating by applying a compactor to the inner surface of the coating and moving the compactor along with the dispenser so that it follows the dispenser along said U-shaped path and is spaced downstream from said dispenser along said path.
2. A method as claimed in claim 1 wherein the compactor is laterally spaced from the dispenser so as to compact the portion of the coating applied to the preceding U-shaped path to that along which the dispenser is travelling in use.

* * * * *